United States Patent
Zuk et al.

(10) Patent No.: US 8,594,085 B2
(45) Date of Patent: Nov. 26, 2013

(54) L2/L3 MULTI-MODE SWITCH INCLUDING POLICY PROCESSING

(75) Inventors: Nir Zuk, Palo Alto, CA (US); Yuming Mao, Milpitas, CA (US); Haoying Xu, San Jose, CA (US); Arnit Green, Redwood City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 475 days.

(21) Appl. No.: 11/734,198

(22) Filed: Apr. 11, 2007

(65) Prior Publication Data

US 2008/0253366 A1 Oct. 16, 2008

(51) Int. Cl.
*H04L 12/28* (2006.01)

(52) U.S. Cl.
USPC ............................. 370/389; 370/230; 370/235

(58) Field of Classification Search
USPC .......................................................... 370/389
See application file for complete search history.

(56) References Cited

U.S. PATENT DOCUMENTS

| | | | |
|---|---|---|---|
| 5,440,719 A * | 8/1995 | Hanes et al. | 703/21 |
| 6,147,993 A | 11/2000 | Kloth et al. | |
| 6,553,028 B1 * | 4/2003 | Tang et al. | 370/389 |
| 6,728,885 B1 | 4/2004 | Taylor et al. | |
| 6,772,347 B1 | 8/2004 | Xie et al. | |
| 6,912,592 B2 | 6/2005 | Yip | |
| 7,089,294 B1 | 8/2006 | Baskey et al. | |
| 7,093,280 B2 | 8/2006 | Ke et al. | |
| 7,155,572 B2 | 12/2006 | Hughes et al. | |
| 7,302,700 B2 | 11/2007 | Mao et al. | |
| 7,486,673 B2 | 2/2009 | Harijono et al. | |
| 7,650,634 B2 | 1/2010 | Zuk | |
| 7,779,459 B2 | 8/2010 | Mao et al. | |
| 8,077,723 B2 | 12/2011 | Zuk et al. | |
| 2001/0027526 A1 | 10/2001 | English et al. | |
| 2002/0026482 A1 * | 2/2002 | Morishige et al. | 709/206 |
| 2003/0065944 A1 * | 4/2003 | Mao et al. | 713/201 |
| 2004/0105440 A1 * | 6/2004 | Strachan et al. | 370/389 |

(Continued)

FOREIGN PATENT DOCUMENTS

| | | |
|---|---|---|
| FR | 2868230 | 9/2005 |
| JP | 2004-356983 | 12/2004 |

(Continued)

OTHER PUBLICATIONS

Attig, M., and Lockwood, J. (2005). A framework for Rule Processing in Reconfigurable Network Systems. Proceedings of the 13th Annual IEEE Symposium on Field-Programmable Custom Computing Machine (FCCM '05).

(Continued)

*Primary Examiner* — Ayaz Sheikh
*Assistant Examiner* — Hai-Chang Hsiung
(74) *Attorney, Agent, or Firm* — Van Pelt, Yi & James LLP

(57) ABSTRACT

Methods and apparatus for processing data packets in a computer network are described. One general method includes receiving a data packet; examining the data packet to classify the data packet including classifying the data packet as a L2 or L3 packet and including determining at least one zone associated with the packet; processing the packet in accordance with one or more policies associated with the zone; determining forwarding information associated with the data packet; and if one or more policies permit, forwarding the data packet toward an intended destination using the forwarding information.

12 Claims, 4 Drawing Sheets

(56) References Cited

U.S. PATENT DOCUMENTS

| | | |
|---|---|---|
| 2005/0044422 A1* | 2/2005 | Cantrell et al. ............... 713/201 |
| 2005/0182950 A1 | 8/2005 | Son et al. |
| 2005/0190694 A1 | 9/2005 | Ben-Nun et al. |
| 2005/0216770 A1 | 9/2005 | Rowett et al. |
| 2005/0257263 A1* | 11/2005 | Keohane et al. ............... 726/22 |
| 2006/0041936 A1* | 2/2006 | Anderson et al. ............... 726/11 |
| 2006/0056297 A1* | 3/2006 | Bryson et al. ............... 370/230 |
| 2006/0098649 A1 | 5/2006 | Shay |
| 2006/0137002 A1 | 6/2006 | Forrester |
| 2006/0227758 A1* | 10/2006 | Rana et al. ............... 370/351 |
| 2006/0233100 A1 | 10/2006 | Luft et al. |
| 2007/0011734 A1 | 1/2007 | Balakrishnan et al. |
| 2007/0056038 A1 | 3/2007 | Lok |
| 2007/0121615 A1* | 5/2007 | Weill et al. ............... 370/389 |
| 2007/0289010 A1 | 12/2007 | Thomas et al. |
| 2007/0297333 A1 | 12/2007 | Zuk et al. |
| 2008/0186897 A1 | 8/2008 | Rune et al. |
| 2008/0253366 A1 | 10/2008 | Zuk et al. |
| 2009/0213858 A1 | 8/2009 | Dolganow et al. |

FOREIGN PATENT DOCUMENTS

| | | |
|---|---|---|
| JP | 2005-229573 | 8/2005 |
| JP | 2008-11537 | 1/2008 |
| WO | WO2007/120165 | 10/2007 |
| WO | WO2008/002930 | 1/2008 |
| WO | WO2008/128085 | 10/2008 |

OTHER PUBLICATIONS

Cisco SCE Service Control Engine, Cisco Systems, Inc. 2008, 2 pages.
Optimizing Application Traffic with Cisco Service Control Technology, Cisco Systems, Inc. 2008, 7 pages.
Policy-Based Routing, Cisco Systems, Inc. 1996, 7 pages.
European Search Report for EP Application No. 07012529.9, dated Nov. 7, 2007.
International Search Report and Written Opinion for PCT Application No. PCT/US2008/60089, dated Jul. 23, 2008.
Action and Response History in U.S. Appl. No. 11/475,393.
Roesch, M., "Snort—Lightweight Instruction Detection for Networks," Proceedings of LISA '99: 13th Systems Administration Conference, Nov. 7-12, 1999, pp. 229-238.
Examination Report in EP Application No. 07 12 529.9, dated Sep. 8, 2009.
Notice of Reasons for Rejection in Japanese Application No. 2007-168277, dated Dec. 15, 2009.
International Preliminary Report on Patentability in Application No. PCT/US2008/060089, dated Oct. 13, 2009.

* cited by examiner

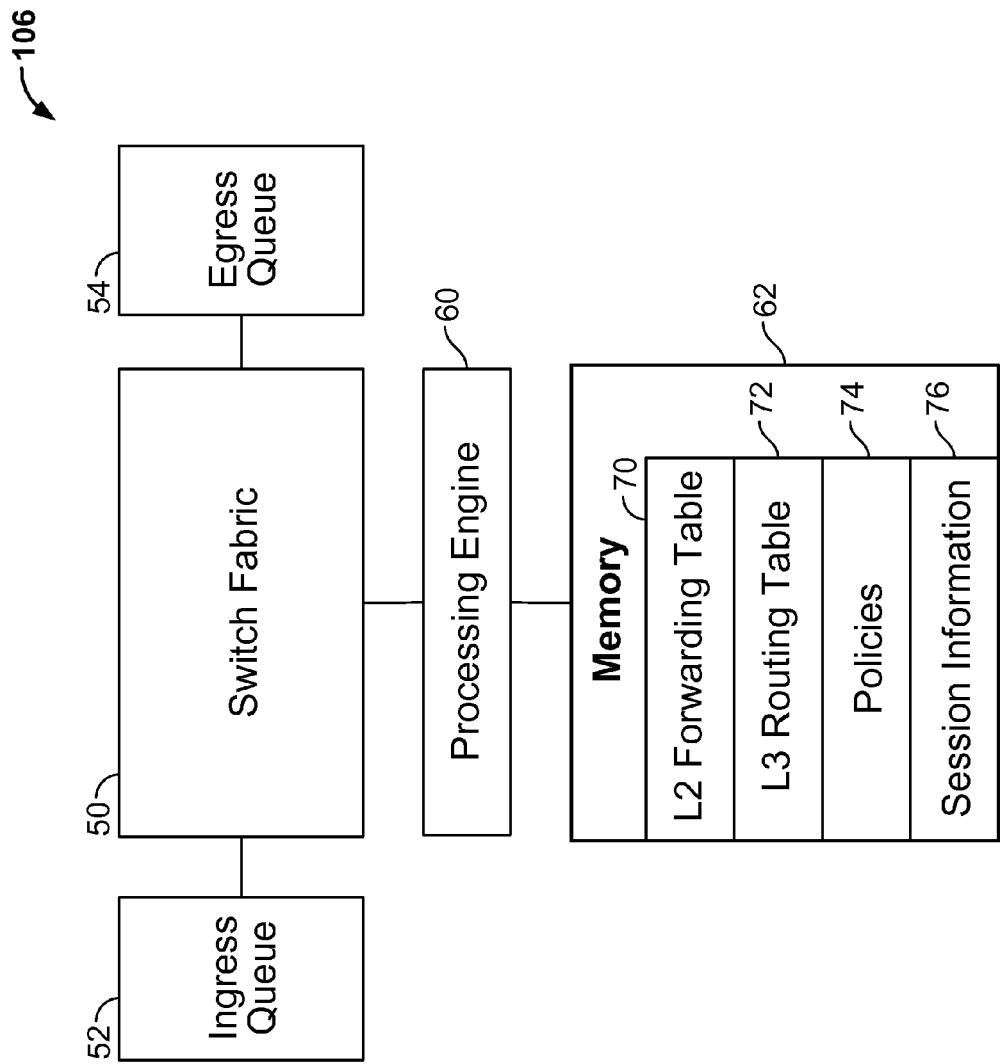

L2/L3 MULTI-MODE SWITCH INCLUDING POLICY PROCESSING

BACKGROUND

The present invention relates to methods and apparatus for controlling computer network security.

A conventional switch is a multiport network device that can be used to connect elements of a communication network. Fundamentally, the switch operates to provide routing services for transporting packets through the switch on toward a destination.

A Layer 2 switch provides Ethernet frame forwarding based completely on a media access control (MAC) addresses contained in each frame and associated with the destination. Accordingly, a conventional Layer 2 switch will provide packet forwarding if the switch knows the destination's location (or based on assumptions of a destination's location). A conventional Layer 2 switch may be programmed with such information or learn dynamically. A MAC table (or L2 Forwarding Table) is the repository of the learned information, allowing for routing decisions to be made based on the destination MAC address to a proper port of the device.

In addition to switching, Layer 2 switches can perform access control using, for example, access control lists (ACLs). ACLs can be used to identify frames according to their MAC addresses, VLAN IDs, protocol types (for non-IP frames), IP addresses, protocols, and Layer 4 port numbers. ACLs can be used to stop the forwarding process.

As a final matter, Layer 2 switches can include other control lists that can be used to control quality of service (QoS). QoS ACLs can be used to classify incoming frames according to quality of service (QoS) parameters, to police or control the rate of traffic flows, and to mark QoS parameters in outbound frames.

A multilayer switch (or one that conforms to the multilayer switching (MLS) protocol) can be used to perform switching at different levels, using two different types of information as a basis for forwarding decisions. One example is a Layer 2/Layer3(L2/L3) switch. In a conventional L2/L3 switch, each packet is pulled off an ingress queue and inspected for both Layer 2 and Layer 3 destination addresses. The decision where to forward the packet is based on two address tables (an L2 forwarding table and a L3 forwarding table). How or whether to forward the packet is still based on access control list results. For the L2 forwarding decision, the destination MAC address is used as an index to the L2 forwarding table. If the frame contains a Layer 3 packet to be forwarded, the destination MAC address is that of a Layer 3 port on the switch. Similarly, the L3 forwarding table is consulted, using the destination IP address as an index. The longest match in the table is found (both address and mask), and the resulting next-hop Layer 3 address is obtained. The L3 forwarding table can also contain each next-hop entry's Layer 2 MAC address and the egress switch port (and VLAN ID), so that further table lookups are not necessary.

SUMMARY

The present invention provides methods and apparatus, including computer program products, for classifying data packets and for implementing computer network security.

In one aspect a method includes receiving a data packet, examining the data packet to determine if the packet is a layer 2 or layer 3 packet for forwarding purposes, determining a zone associated with the packet and a security policy (e.g., based on one of the target or source destination), starting a session based on the policy determination and forwarding the packet in accordance with the look-up information. Subsequent packets are then processed in accordance with the security policy, session information and L2/L3 forwarding tables.

In another aspect a method for forwarding data packets in a computer network includes receiving a data packet; examining the data packet to classify the data packet including classifying the data packet as a L2 or L3 packet and including determining at least one zone associated with the packet; processing the packet in accordance with one or more policies associated with the zone; determining forwarding information associated with the data packet; and if one or more policies permit, forwarding the data packet toward an intended destination using the forwarding information.

Aspects of the invention can include none, one or more of the following features. Determining a zone can include determining a destination zone associated with the data packet. Determining a zone can include determining a source zone associated with the data packet. Processing the packet can include classifying the packet in accordance header data. Processing the packet can include classifying the packet in accordance with signature data. Processing the data packet can include classifying the packet based on the content. Processing the packet can include content based protocol decoding. Processing the packet can include content based object extraction. Processing the packet can include content based pattern matching. Processing the packet can be selected from the group consisting of logging, storing, allowing the packet to pass, setting an alarm, blocking, or dropping the packet.

In another aspect a device is provided that can include a multi-mode switch for classifying received data packets as L2 or L3 packets and determining a zone associated with received packets. The device includes an L2 routing table for use in determining a L2 forwarding definition, an L3 routing table for use in determining a L3 routing definition, a policy engine for determining one or more policies associated with received packets based on a zone, a policy set; and a processing engine for processing the received packets in accordance with any associated policies and forwarding received packets in accordance with L2/L3 forwarding/routing definitions.

Aspects of the invention can include none, one or more of the following features. The device can include a session engine for determining a session associated with a packet flow. The multi-mode switch can be operable to determine a destination zone associated with a received packet. The multi-mode switch can be operable to determine a source zone associated with a received packet. The device can include a plurality of ingress ports, egress ports and a switch fabric.

The details of one or more implementations of the invention are set forth in the accompanying drawings and the description below. Other features and advantages of the invention will become apparent from the description, the drawings, and the claims.

DESCRIPTION OF DRAWINGS

FIG. 2a illustrates a block diagram of a multi-mode switch.

FIG. 2b illustrates a detailed block diagram of a processing engine of the multi-mode switch of FIG. 2a.

Like reference numbers and designations in the various drawings indicate like elements.

DETAILED DESCRIPTION

Proposed are systems, apparatus, methods, computer program products and the like for a method for forwarding data packets in a computer network. One example method includes receiving a data packet for forwarding. The data packet is examined to classify the data packet including classifying the data packet as a L2 or L3 packet. The classification includes determining a zone associated with the packet. The zone determination can include only the determination of a destination zone or source zone, or alternatively both can be determined. The data packet is processed in accordance with one or more policies associated with the determined zone(s). Processing can include numerous operations including allowing the packet, dropping the packet, setting an alarm, logging the packet, other actions or combinations of these. Subsequent look-ups are performed including determining forwarding information associated with the data packet, using for example L2 forwarding and L3 routing tables. If the one or more policies permit, the data packet can be forwarded toward an intended destination using the forwarding information.

Figure 1:
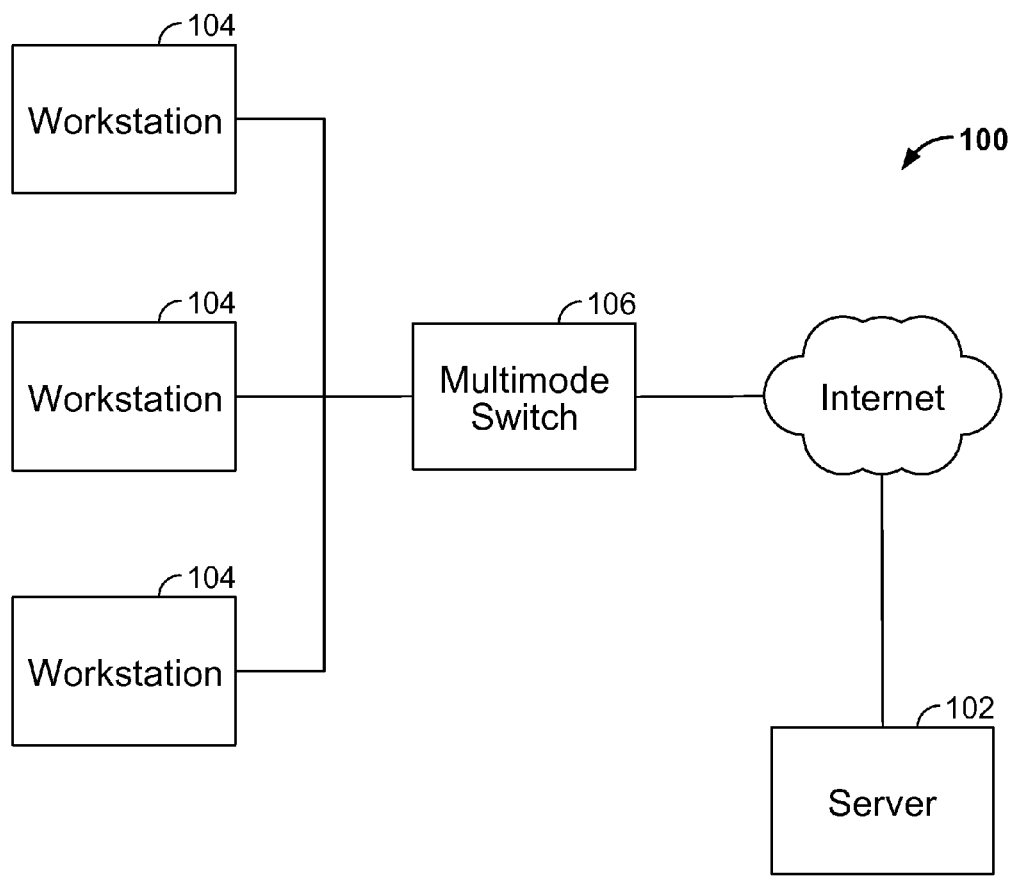
FIG. 1 shows a block diagram of a network topology that includes a multi-mode switch.

FIG. 1 shows a simple network topology including a local area network (LAN) 100, a server 102, several workstations (W/S) 104, and a multi-mode switching security device (hereinafter simple referred to here as "multi-mode switch") 106. The network topology is merely representative of one implementation for the use of multi-mode switch 106. Other network topologies are possible including those that include more than one network, wide area network(s), local area networks or combinations of both with or without distributed topologies (e.g., topologies other than client-server topologies).

Referring now to FIG. 2a, the multi-mode switch 106 includes switch fabric 50 coupled between ingress and egress queues 52, 54. Ingress queues and egress queues 52, 54 are coupled to ports of the multi-mode switch 106. Multi-mode switch 106 includes a processing engine 60 that is coupled to one or more memory elements 62 for processing received packets. Processing engine 60 can be of the form of hardware or software of combinations of both. Further, though a single processing engine is shown, plural processing engines can be included each performing separate parts of the processes described below. Alternatively, a plurality of similar processing engines can be included that are programmed or configured to execute similar operations. The configuration shown should not be construed as limiting.

Memory 62 can include content addressable memory and contain indexes that are used to determine forwarding instructions. Memory 62 includes a L2 forwarding table 70, a L3 routing table 72, policies 74, and session information 76. L2 forwarding table 70 includes forwarding information that is indexed by a MAC destination address. L3 routing table includes forwarding information that is indexed by a destination internet protocol address. Policies 74 include policy rules that are indexed by zone, either destination or source zone. Session information 76 includes flow instructions associated with a session that has been previously characterized and processed by the processing engine 60. Policies and sessions are described in greater detail below.

The computer workstations, servers and other devices in the LAN are interconnected using a number of data transmission media such as wire, fiber optics, and radio waves. The multi-mode switch 106 forwards packets through the network as well as monitors packets being communicated within the network to facilitate the blocking of packets associated with an attempted network security intrusion.

Figure 2B:
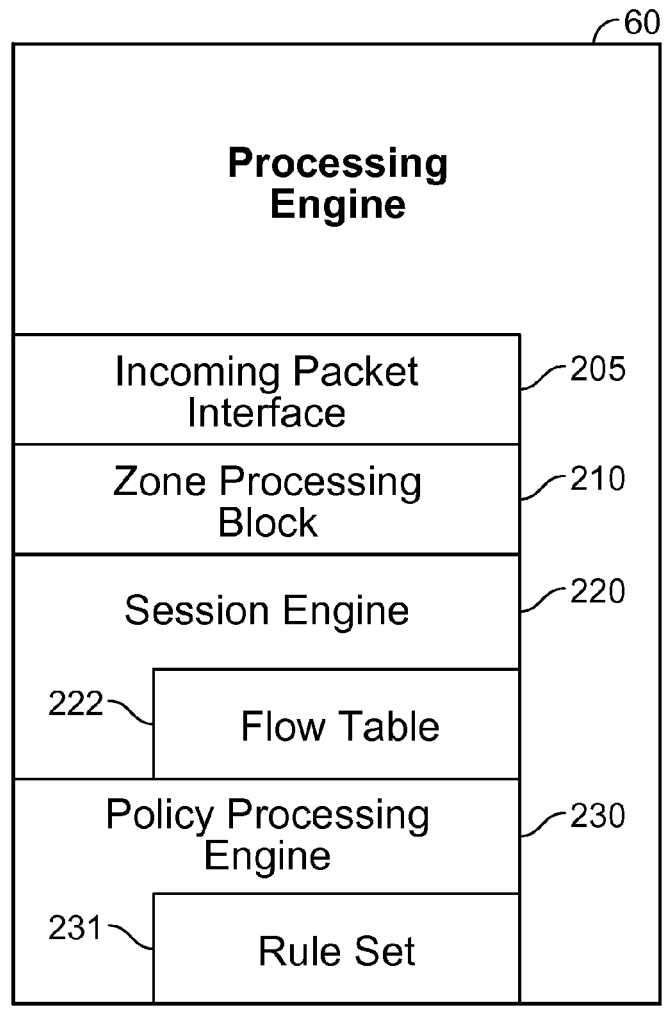

FIG. 2b shows a block diagram of processing engine 60. In one implementation, processing engine 60 includes an incoming packet interface 205, zone processing block 210, session engine 220, and policy processing engine 230.

Processing engine 60 includes an incoming packet interface 205 for receiving packets from the various ingress queues 52. Which queues provide packets and in which order can be controlled by a separate queue management engine (not shown) in accordance with various QoS parameters. The received packets are analyzed by a zone classification block 210 to determine what zone (one or both of a destination and source zone) is/are associated with the given packet. Based on the zone classification, one or more policies can be applied to the processing of the packet.

Session engine 220 can be used to allow for the quick processing of packets that have already been classified. Session engine 220 can initially be used to create a session associated with a particular packet flow (e.g., a session associated with a particular flow that has a given destination zone). Thereafter, the session engine 220 can be used to speed the decision process for handling subsequent packets for a same flow.

The session engine 220 also includes a flow table 222. The flow table 222 is used to store information regarding flows associated with received packets. Associated with a flow can be one or more rules stored or indicated in the flow table 222. The rules can be used to further process packets associated with a given flow. The flow table 222 includes flow records associated with current TCP/IP flows. A TCP/IP flow includes a sequence of data packets communicating information between a source and a destination in one direction. The flow records can be indexed using an indexing key. The indexing key can be used to store and retrieve the appropriate flow record associated with a received packet. In one implementation, the indexing key can be a hash key and the flow table 222 can be implemented as a hash table. The flow table 222 stores instructions that can be used by one or more modules in the multi-mode switch 106 to further process received packets. The flow record can include flow information. Flow information can be of the form of policy information (firewall policy, IPS policy etc., to apply to the flow) as well as other information that is used by the other modules in the multi-mode switch 106 such as encryption parameters, address translation parameters, bookkeeping information, and statistics. The flow information can also include information required by the session engine 220 in order to decide whether the packet should be allowed. Such information can include information required to implement network policies regarding, for example connection time out, time billing, and bandwidth usage.

Policy processing engine 230 operates to apply a policy to a given packet based, for example on information returned by the zone processing block 210 and session engine 220. Policy processing engine 230 has an associated rule set 231 that includes policy information.

Rule set 231 can include policy information (firewall policy, IPS policy etc., to apply to the classified packets) as well as other information that is used by the other modules in the security device 106 such as encryption parameters, address translation parameters, bookkeeping information, and statistics. The rule set 231 can also include information required by the multi-mode switch 106 in order to decide whether the packet should be allowed. Such information can include information required to implement network policies regarding, for example connection time out, time billing, and bandwidth usage. Though rule set 231 and flow table 222 are shown as components of processing engine 60, they can be located remotely (e.g., included in memory 62).

Figure 3:
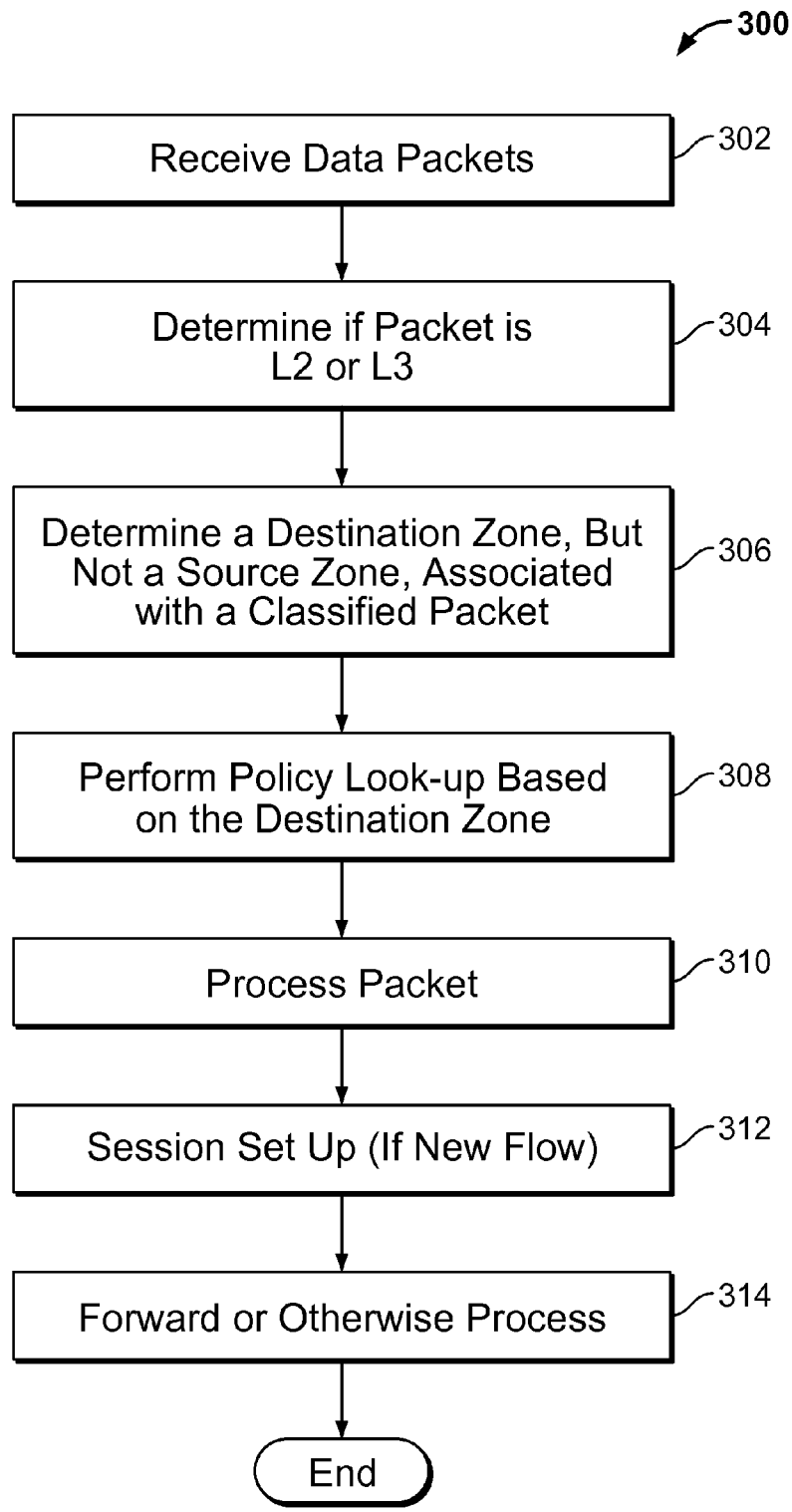
FIG. 3 shows a flow diagram describing the operation of the multi-mode switch.

FIG. 3 is a flow diagram describing the operation 300 of the multi-mode switch 106. Referring now to FIGS. 2a and 2b, incoming packets are received by, for example the packet 5 interface 205 (step 302). Packets can be initially processed (e.g., de-fragmented and headers validated) as required. An initial determination is made as to whether the received packet is a layer 2 or layer 3 packet, e.g., by processing engine 60 (step 304). At least one zone associated with the packet is determined (step 306). In one implementation, the destination zone associated with the packet is determined. Alternatively, both source and destination zones can be determined (e.g., by zone processing block 210). A policy look-up is performed to locate (e.g., in rules set 231) one or more policies associated with the packet based on the zone information (step 308). The policy look-up can be performed by the policy processing engine 230.

Packet processing in accordance with the policy can be performed (step 310). Packet processing can include the application of a policy determined in the look-up step. A session can be established for the packet flow (step 312). Finally, the packet can be forwarded or otherwise processed based on the policy processing outcome (step 314). Other processing can include logging particular information regarding the packet, holding the packet, modifying the packet, dropping the packet or banning the entire flow.

In one particular implementation, in addition to zone based classification, the packets are classified in accordance with both content and header information, by for example a multi-mode classification engine. Based on the classification, specialized processing can be performed including one or more of content-based protocol decoding, content based object extraction and content based pattern matching. A determination can be made if the packet should be allowed based on information obtained regarding the header (including flow information developed for example in session engine 220), the content or the specialized processing. Packet classification is described in greater detail in co-pending and commonly owned U.S. patent application Ser. No. 11/475,393, entitled "PACKET CLASSIFICATION IN A NETWORK SECURITY DEVICE", filed Jun. 26, 2006, the contents of which are expressly incorporated herein by reference.

The multi-mode switch 106 can be used in a number of different network topologies. The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

This invention has been described in terms of particular embodiments. Nevertheless, it will be understood that various modifications may be made without departing with the spirit and scope of the invention. For instance, the steps of the invention can be performed in a different order and still achieve desirable results. Accordingly, other embodiments are within the scope of the following claims.

What is claimed is:

1. A method for forwarding data packets in a computer network, the method comprising:
    receiving, by a processor, a data packet;
    examining the data packet using the processor to classify the data packet including classifying the data packet as a L2 or L3 packet;
    performing zone determination on the classified data packet including determining only a destination zone, but not a source zone, associated with the classified data packet, wherein the destination zone is associated with at least one policy rule, and wherein a policy includes one or more policy rules that are indexed by the destination zone;
    determining one or more policies based on the zone determination;
    processing the classified data packet in accordance with the one or more determined policies including:
        performing content based pattern matching on the classified data packet in accordance with signature data including determining one or more content based policies associated with matched packets; and forwarding the classified data packets to an intended destination if the determined policies permit based on the destination zone and content based pattern matching.

2. The method of claim 1, wherein processing the classified data packet includes processing the classified data packet in accordance with header data.

3. The method of claim 1, wherein processing the classified data packet includes processing the classified data packet based on the content.

4. The method of claim 1, wherein processing the classified data packet includes performing content based protocol decoding on the classified data packet.

5. The method of claim 1, wherein processing the classified data packet includes performing content based object extraction on the classified data packet.

6. The method of claim 1, wherein processing the classified data packet is selected from a group consisting of logging, storing, allowing the packet to pass, setting an alarm, blocking, or dropping the classified data packet.

7. The method of claim 1, wherein determining the one or more policies based on the zone determination includes determining the one or more policies based on the destination zone without regard for the source zone.

8. A device comprising:
a multi-mode switch for classifying received data packets as L2 or L3 packets;
a zone processing module to perform zone determination that includes only a destination zone, but not a source zone, associated with the classified received data packets, wherein the destination zone is associated with at least one policy rule;
an L2 forwarding table for determining a L2 forwarding definition;
an L3 routing table for determining a L3 routing definition;
a policy engine for determining one or more policies associated with the classified received data packets based on the zone determination, the policy engine including a policy set indexed by only the destination zone and excluding the source zone;
a processing engine for processing the classified received data packets in accordance with any associated policies including:
performing content based pattern matching on the classified received data packets in accordance with signature data including determining one or more content based policies associated with matched packets; and
forwarding data packets in accordance with any determined policies, the L2 forwarding definition and the L3 routing definition; and
a session engine for determining a session associated with a packet flow of the classified received data packets based on the destination zone.

9. The device of claim 8 further comprising a plurality of ingress ports, egress ports and a switch fabric.

10. A method comprising:
receiving, by a processor, a data packet;
examining the data packet using the processor to determine if the data packet is a layer 2 or layer 3 data packet for forwarding purposes;
performing zone determination on the examined data packet including:
determining a destination zone associated with the examined data packet; and
determining a security policy for the examined data packet based only on the destination zone and without regard for a source zone associate with the data packet, wherein the destination zone is associated with at least one policy rule, and wherein a policy includes one or more policy rules that are indexed by the destination zone;
starting a session based on the destination zone and the determined security policy;
performing content based pattern matching on the examined data packet including determining one or more content based policies associated with matched packets; and
forwarding the data packets in accordance with any determined policies.

11. The method of claim 10 further comprising processing subsequent packets in accordance with any determined policies, session information associated with the session, L2 forwarding definition and L3 routing definition.

12. A method for forwarding data packets in a computer network comprising:
receiving, by a processor, a data packet;
examining the data packet to classify the data packet including classifying the data packet as a L2 or L3 packet;
performing zone determination on the classified data packet including determining only a destination zone associated with the classified data packet;
determining one or more policies associated with the determined destination zone associated with at least one policy rule without referencing any other zone associated with the classified data packet, and wherein each of the one or more policies includes one or more policy rules that are indexed by the determined destination zone;
processing the classified data packet in accordance with the one or more determined policies including:
performing content based pattern matching on the classified data packets including determining one or more content based policies associated with matched packets; and
forwarding the data packets to an intended destination if the one or more determined policies permit based on the destination zone and content based pattern matching.

* * * * *